United States Patent [19]

Muryoi

[11] 4,264,178
[45] Apr. 28, 1981

[54] DIAPHRAGM DEVICE OF A PHOTOGRAPHIC LENS

[75] Inventor: Takeshi Muryoi, Chigasaki, Japan

[73] Assignee: Nippon Kogaku K.K., Tokyo, Japan

[21] Appl. No.: 105,781

[22] Filed: Dec. 20, 1979

[30] Foreign Application Priority Data

Dec. 27, 1978 [JP] Japan .................................. 53/159929
Dec. 28, 1978 [JP] Japan .................................. 53/161175

[51] Int. Cl.³ .............................................. G03B 9/06
[52] U.S. Cl. .................................................... 354/274
[58] Field of Search ................................ 354/270–274

[56] References Cited

U.S. PATENT DOCUMENTS

| | | | |
|---|---|---|---|
| 3,590,715 | 7/1971 | Schops | 354/274 X |
| 3,922,699 | 11/1975 | Yamaki | 354/274 X |
| 3,997,906 | 12/1976 | Kashiwase | 354/272 X |

*Primary Examiner*—John Gonzales
*Attorney, Agent, or Firm*—Fitzpatrick, Cella, Harper & Scinto

[57] ABSTRACT

This specification discloses the diaphragm device of a photographic lens in which the stop-down operating performance over the entire area from the maximum aperture to the minimum aperture is made uniform and no aperture error occurs in the practical aperture range.

6 Claims, 9 Drawing Figures

DIAPHRAGM DEVICE OF A PHOTOGRAPHIC LENS

BACKGROUND OF THE INVENTION

1. Field of the Invention

This invention relates to the diaphragm device of a photographic lens.

2. Description of the Prior Art

As the diaphragm device of the conventional ordinary photographic lens, there is known a construction in which one pin of a diaphragm blade is pivotally supported on a fixed portion while the other pin is fitted in a straight groove formed in a diaphragm driving ring and a stop-down lever engaging the aperture setting lever of a camera is turnable with the diaphragm driving ring. According to this device, when the diaphragm blade is stopped down from the maximum aperture diameter toward the minimum aperture diameter, the aperture diameter is decreased by $1/\sqrt{2}$ times each in accordance with the stop-down of one aperture step (1 Av by APEX indication.) In a converse case, as the aperture approaches the open aperture, the aperture diameter is enlarged by $\sqrt{2}$ times each for the variation of one aperture step. That is, the aperture diameter varies geometrically and along with it, the stroke of the stop-down lever also varies geometrically.

In the stroke characteristic of the stop-down lever shown in FIG. 1 of the accompanying drawings, this conventional photograhic lens exhibits the curve represented by broken line A, and as shown by this curve, in the conventional construction, when aperture control is effected by the stop-down lever, the stroke of the stop-down lever per aperture step becomes smaller as the aperture diameter is smaller and thus, the control accuracy thereof becomes worse.

Therefore, there is known a construction in which a cam is provided on the diaphragm driving ring so that the stroke of the stop-down lever varies arithmetically for the variation of each aperture step, as indicated by straight line B in FIG. 1. With this construction, however, the amount of variation in aperture diameter per aperture step is great particularly in the vicinity of the open aperture as already mentioned, and accordingly, the amount of displacement of the diaphragm blade is great and therefore, in the vicinity of the first step of stop-down, the efficiency of the cam is aggravated by the frictional loss of the cam surface and at the same time, the rising speed of stop-down is reduced to aggravate the follow-up characteristic of the diaphragm blade in the vicinity of the open aperture or prolong the stop-down time up to the required aperture value.

Such disadvantage may be overcome by providing cam means for controlling the amount of displacement of the stop-down lever on a member in a path through which the drive force of the stop-down lever is transmitted to the diaphragm blade (for example, forming a cam groove in the diaphragm driving ring and causing the pin of the diaphragm blade to engage the cam groove), determining a standard setting curve as shown by solid line C in FIG. 1 so that the amount of displacement of the stop-down lever for a variation in aperture step number varies geometrically in an area x in the vicinity of the first step of stop-down wherein the amount of variation in aperture diameter is particularly great and that said amount of displacement varies arithmetically in the succeeding area y, and determining the shape of the cam so that the stop-down lever operates on the basis of the standard setting curve.

Thus, the aforementioned disadvantage is eliminated, but in all of various interchangeable lenses having different open aperture diameters, to cause the stroke of the stop-down lever to operate for the aperture step number as per this standard setting curve, it is necessary to manufacture exclusive diaphragm driving rings having different cam grooves for each of the various interchangeable lenses. To avoid this, it occurs to mind that, of three types of interchangeable lenses having different open aperture diameters, namely, lens A (having an open aperture diameter $\phi_A$), lens B (having an open aperture diameter $\phi_B$) and lens C (having an open aperture diameter $\phi_C$), the shape of the cam groove of the diaphragm driving ring of the lens A is formed so as to impart to the stop-down lever the operation as per the standard setting curve and that in the other interchangeable lenses B and C having smaller open aperture diameters than the A lens, a diaphragm driving ring identical to the diaphragm driving ring of the lens A is mounted in a condition in which it has been rotated until the open aperture diameters become $\phi_B$ and $\phi_C$, respectively, whereby the diaphragm driving ring is used as a part common to the various interchangeable lenses, whereas this encounters the following inconvenience. For example, to mount said diaphragm driving ring to the lens C having an open aperture diameter $\phi_C$ smaller by 1 Av than the open aperture diameter $\phi_A$ of the lens A, it is necessary to rotate the driving ring and mount it in a condition in which it has been stopped down by 1 Av in advance through said cam groove, and to use this as the open aperture diameter of the lens C. However, due to the stop-down resulting from such rotation during the mounting, the line of the stroke of the stop-down lever of the lens C becomes a substantially straight line as indicated by alternate long and two short dashes line in FIG. 2 of the accompanying drawings which differs from the standard setting curve. When photography is effected by the use of this lens and in a case where proper exposure is to be provided with the aperture stopped down, for example, by two steps under the shutter speed priority and automatic aperture control system, the stop-down lever is stopped at the position of $a_1$ and creates an aperture error of $\Delta C$, so that underexposure is provided (see FIG. 2).

Likewise, when the technique of using a cam which controls the operation of the stop-down lever on the basis of said standard setting curve is intactly used with a zoom lens or a macrolens, the following inconvenience is encountered. In most of standard zoom lenses, wide angle zoom lenses or macrolenses, the F-number is maintained constant by varying the aperture diameter in response to zooming or focusing. The zoom lens shown in FIG. 3 comprises a first lens group and a second lens group and the zooming thereof is accomplished by moving these two lens groups relative to each other. A diaphragm 1 is provided in the second lens group and is displaceable with the lens. In FIG. 3, the solid lines show the telephoto position and assuming that the diaphragm 1 (aperture diameter $\phi T$) at this time is in open condition, in order to maintain the F-number constant when the lens group I' and II' have been moved to the wide angle position indicated by phantom lines, it is necessary to rotate the diaphragm driving ring with the movement of the lens group and stop down the diameter of the diaphragm 1' to $\phi W$.

Accordingly, if said cam means is provided in the diaphragm driving ring of such zoom lens, when the diaphragm lies at the telephoto position indicated by 1 in FIG. 3, the relation between the aperture step number and the stroke of the stop-down lever becomes as per the standard setting curve as indicated by solid line C in FIG. 4, but when the diaphragm is moved to the wide angle position indicated at 1' in FIG. 3 by zooming, the diaphragm driving ring is rotated with such movement of the diaphragm to cause the pin of the diaphragm blade to slide in the cam groove and therefore, the relation between the aperture step number an the stroke of the stop-down lever creates an error of $\Delta d$ with respect to the standard setting curve, as indicated by phantom line C' in FIG. 4.

Also, there are some lenses in which only the aperture diameter is varied in response to zooming with the position of the diaphragm remaining fixed, but such lenses encounter a similar inconvenience.

SUMMARY OF THE INVENTION

It is a primary object of the present invention to provide the diaphragm device of a photographic lens in which the stop-down operating performance over the entire area from the maximum aperture to the minimum aperture is made uniform and no aperture error occurs in the practical aperture range.

It is a secondary object of the present invention to provide the diaphragm device which permits an exclusive part providing an element for achieving the above primary object to be commonly used with a plurality of photographic lenses having different open aperture diameters.

It is a tertiary object of the present invention to provide the diaphragm device of a zoom lens or a macrolens which has achieved the aforementioned primary object.

The invention will become fully apparent from the following detailed description thereof taken in conjunction with the accompanying drawings.

DESCRIPTION OF THE PREFERRED EMBODIMENTS

The invention will hereinafter be described with respect to some embodiments thereof.

Figure 1:
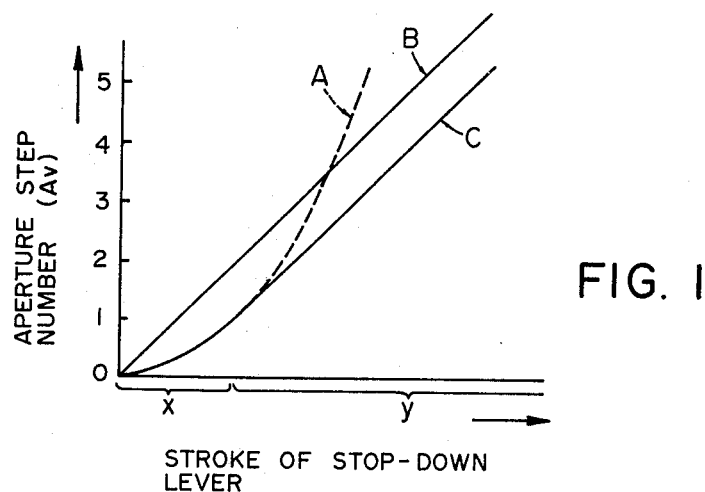
FIGS. 1, 2, 4, 6 and 8 are graphs illustrating the stroke curves of the stop-down lever.
Figure 5:
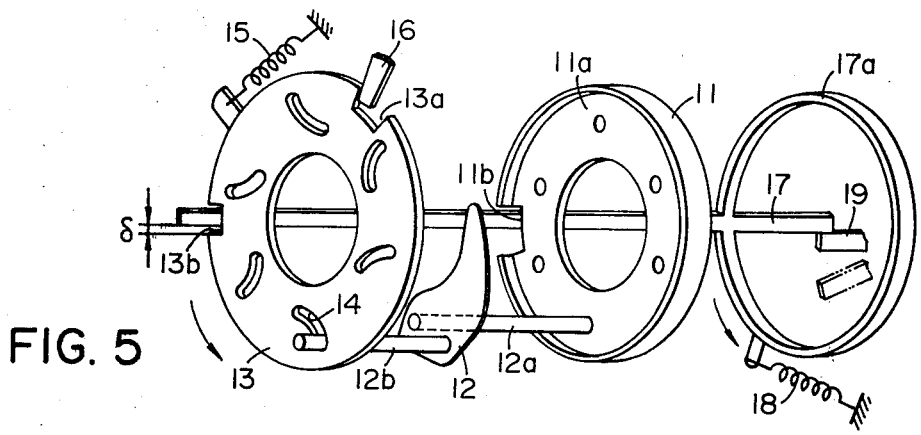
FIG. 5 is a perspective view showing a first embodiment of the present invention.

Referring to FIG. 5 which shows a first embodiment of the present invention, a fixed ring 11a rotatably supporting a pin 12a coupled to a diaphragm blade 12 is provided in an diaphragm unit body 11 provided on a lens barrel body fixed portion, not shown. The diaphragm blade 12 and a diaphragm driving ring 13 to be described later are contained within the diaphragm unit 11. Another pin 12b of the diaphragm blade 12 is fitted in a cam groove 14 formed in the diaphragm driving ring 13. The shape of the cam groove 14 is determined so that the characteristic of the relation between the stroke of a stop-down lever 17 to be described later and the variation in aperture step number becomes as shown by the standard set curve C of FIG. 1. That is, the shape of this cam is determined so that in an area x in the vicinity of the first step of stop-down, the stop-down lever is displaced geometrically equal for the variation in aperture step number and in the succeeding area y, the stop-down lever is displaced arithmetically for the variation in aperture step number and that the stop-down lever is smoothly displaced even at the boundary between the area in the vicinity of the first step and the succeeding area, and this boundary point is set so that it lies in the vicinity of one aperture step.

The diaphragm driving ring 13 is rotatably fitted to the lens barrel body and is biased by a spring 15 so as to operate the diaphragm blade 12 in the opening direction. Designated by 16 is a rotation limiting plate engaged with a cut-away 13a.

A stop-down lever 17 having a ring portion 17a rotatably fitted to the lens barrel is biased in the direction of arrow by a spring 18 having a stronger biasing force than said spring 15 and, when mounted to a camera body, it may engage the automatic aperture setting lever 19 of the camera, and passes through a cut-away 11b formed in the aperture unit body 11 and is fitted into a transmission groove 13b formed in the diaphragm driving ring 13. A predetermined gap $\delta$ to be described later is provided between the transmission groove 13b and the stop-down lever 17.

During photography, when an aperture value for providing a proper exposure based on object brightness, shutter speed, film speed, etc. is determined by the metering circuit of the camera, the automatic aperture setting lever 19 is downwardly moved by an amount corresponding to the aperture value immediately before the movement of the forward shutter curtain and along with this, the stop-down lever 17 is downwardly moved by the spring 18. After initial movement of the stop-down lever 17 corresponding to the gap $\delta$ between it and the transmission groove 13b, the stop-down lever 17 engages the transmission groove 13b to rotate the diaphragm driving ring 13 in the direction of arrow and stop down the diaphragm blade 12 through the cam groove 14.

Figure 2:
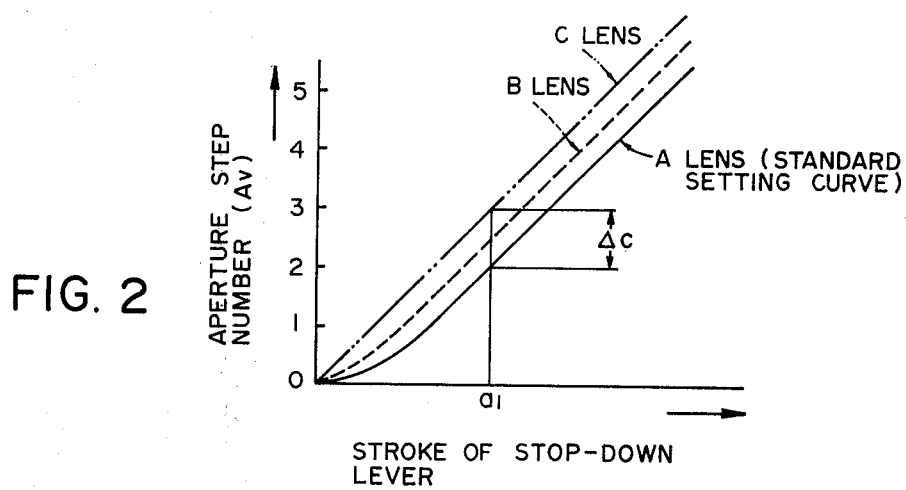

The size of the gap $\delta$ is determined in accordance with the open aperture diameter $\phi$ of the lens. That is, when the lens A described in connection with FIG. 2 is loaded with the diaphragm device of FIG. 5, the position of the diaphragm driving ring 13 relative to the fixed ring 11a is determined by the cut-away 13a and the rotation limiting plate 16 so that the pin 12b of the diaphragm blade lies at the initial sliding position (in the embodiment, the outer peripheral end) in the cam groove 14 and at the same time, the transmission groove 13b is formed so that the aforementioned gap $\delta = 0$. When the lens C is loaded with the diaphragm device of FIG. 5, the size or position of the cut-away 13a is determined so that the rotation of the diaphragm driving ring 13 is limited by the rotation limiting plate 16 at a position whereat the aperture diameter is stopped down so as to be $\phi_C$ by rotating the diaphragm driving ring 13 until the pin 12b of the diaphragm blade comes to the inner peripheral end of the cam groove 14 and at the same time, the gap $\delta$ is formed such that its size $\delta_C$ is determined by FIG. 6.

Figure 6:
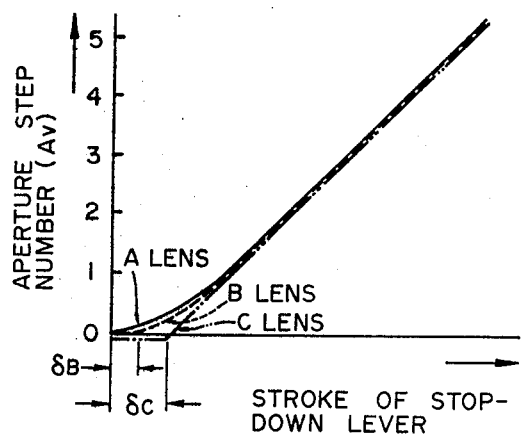

FIG. 6 has been obtained by rightwardly parallel-moving the graphs of the lenses B and C shown in FIG. 2 until the straight portions thereof become coincident with the graph of the lens A. In other words, the device is so constructed that the initial stroke of the stop-down lever in an amount corresponding to the error in the direction of the horizontal axis of the curves in FIG. 2 does not operate the diaphragm blade. Accordingly, in the lens B, the stop-down lever takes part in stop-down after having moved by $\delta_B$ at its initial stage of operation, and in the lens C, the stop-down lever takes part in stop-down after having moved by $\delta_C$.

That is, in the case of the lens B, the size of the gap $\delta$ may be formed to $\delta_B$ determined as described above, and in the case of the lens C, it may be formed to $\delta_C$.

Thus, the stop-down lever 17 does not take part in actual stop-down at its initial stage and accordingly, can eliminate any error in more than one aperture step which is the practical aperture diameter.

Figure 7:
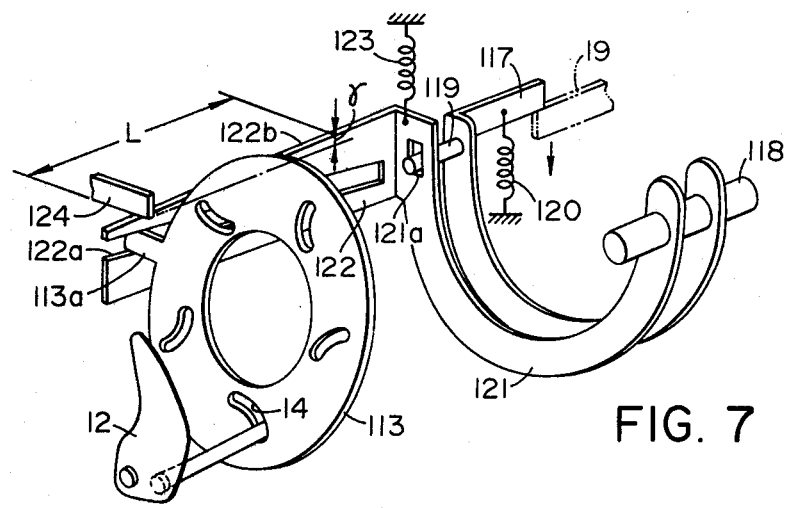
FIG. 7 is a perspective view showing a second embodiment of the present invention.
Figure 8:
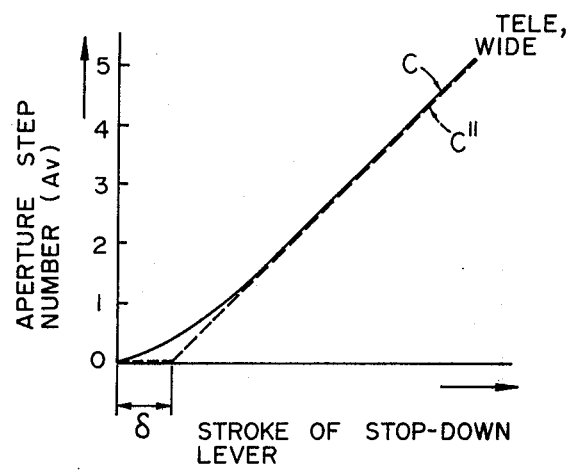

FIG. 7 shows a second embodiment of the present invention in which the invention is applied to a zoom lens having an aperture diameter and an aperture position variable in response to zooming. In FIG. 7, there is shown a diaphragm blade 12 similar to that of FIG. 5, and a diaphragm driving ring 113 having a cam groove 14. The driving ring 113 further has a projection 113a on the outer periphery thereof. A stop-down lever 117 engaging the aperture setting lever 19 of a camera is rotatably mounted on a shaft 118 and has a pin 119 and is downwardly biased by a spring 120, as viewed in FIG. 7. An auxiliary lever 121 rotatably mounted on the shaft 118 and having at one end thereof an arm 122 extending in the direction of the optic axis has a groove 121a in which the pin 119 of the stop-down lever is fitted, and is biased upwardly in Figure by a spring 123 having a smaller biasing force than the aforementioned spring 120. The arm 122 is formed with an inclined groove 122a engaged by the projection 113a of the diaphragm driving ring 113 and a sloped surface 122b having a slope of height r with respect to the stroke L in the direction of the optic axis. The sloped surface 122b is engaged by a projection 124 rectilinearly slidable parallel to the optic axis with the aforementioned second lens group. The position of FIG. 7 is the position in which the zoom lens is at its telephoto position, and the pin 119 is positioned at the lowermost point in the groove 121a of the auxiliary lever 121. When the aperture setting lever 19 is moved by a predetermined amount in the direction of arrow, the stop-down lever 117 is counter-clockwisely rotated about the shaft 118 by the spring 120 and at the same time, the auxiliary lever 121 with the arm 122 is also rotated in the same direction through the pin 119 and the groove 121a, so that the diaphragm driving ring 113 is counterclockwisely rotated by a predetermined amount through the inclined groove 122a and the projection 113a, thus stopping down the diaphragm blade 12. The relation between the stroke and the aperture step number of the stop-down lever 117 at this time is as shown by the standard setting curve C of FIG. 8.

Figure 3:
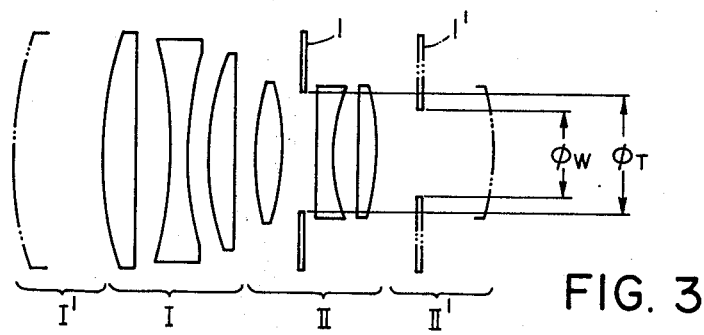
FIG. 3 is a schematic view showing the optical system of a zoom lens and a diaphragm.
Figure 4:
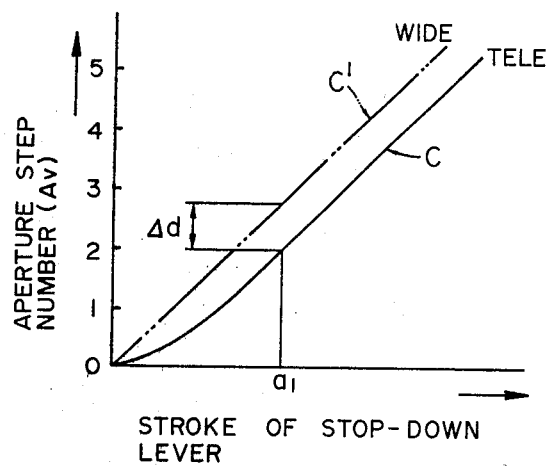

Next, when the second lens group is moved to a wide angle position, the diaphragm blade 12, the diaphragm driving ring 113 and the projection 124 are rightwardly moved together by a distance L, as viewed in FIG. 7. Accordingly, the diaphragm driving ring 113 is counter-clockwisely rotated by the sum of the inclination of the inclined groove 122a and the slope r of the sloped surface 122b, so that the pin of the diaphragm blade is moved in the cam groove 14 to vary the aperture diameter from $\phi r$ of FIG. 3 to $\phi w$ and the pin 119 comes to be positioned at the uppermost point in the groove 121a.

Figure 9:
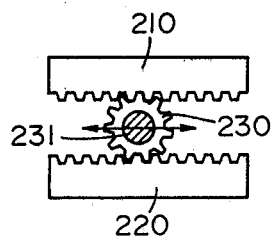
FIG. 9 illustrates the principle of a third embodiment of the present invention.

When the aperture setting lever 19 is moved in this position, the initial stage rotation of the stop-down lever 117 moves the pin 119 from the uppermost point to the lowermost point in the groove 121a, whereafter the auxiliary lever 121 and the arm 122 are displaced to rotate the diaphragm driving ring 113 and actuate the diaphragm blade 12. Here, assuming that the stroke of the stop-down lever corresponding to the distance of sliding movement of the pin 119 in the groove 121a is $\delta$, the stop-down lever does not take part in actual stop-down at the initial stage $\delta$ as shown by broken line C″ in FIG. 8 and accordingly, the error can be eliminated in the practical condition of photography in which the aperture is stopped down by more than one aperture step.

Where the present invention is applied to a lens in which aperture correction is made by varying only the aperture diameter with the aperture position fixed during the zooming, it may also be realized on the basis of the principle shown in FIG. 9. That is, by a differential mechanism comprising a gear 210 operatively associated with a diaphragm driving ring having a cam groove similar to that of FIG. 7, a gear 220 operatively associated with a similar auxiliary lever, and a gear 230 rotatably fitted on a shaft 231 slidable in the direction of arrow in response to the zooming of the lens, the gear 210 moves along the gear 230 with the aid of axial movement of the lens to thereby displace the diaphragm blade while, on the other hand, when the stop-down lever is rotated to rotate the auxiliary lever through the pin 119 and groove 121a of FIG. 7, the sliding movement of the gear 220 operatively associated therewith causes sliding movement of the gear 210 through the gear 230 to thereby displace the diaphragm blade.

What we claim:

1. The diaphragm device of a photographic lens comprising:

(a) diaphragm blade means;

(b) driving means having an operating end portion engageable with a camera, and displaceable in response to the stop-down operation by said camera and driving said diaphragm blade means in accordance with the amount of said displacement;

(c) control means provided between said driving means and said diaphragm blade means for controlling said driving so that the amount of displacement of said operating end portion varies geometrically in an area in which the diaphragm blade means is stopped down from the maximum aperture opening formable by said diaphragm blade means to the vicinity of 1 Av by APEX indication and that the amount of displacement of said operating end portion varies arithmetically in an area in which the diaphragm blade means is further stopped down beyond said first-named area;

(d) means for setting the positional relation between said control means and said diaphragm blade means so that a position in which said diaphragm blade means is stopped down by a predetermined amount from said maximum aperture opening separately from the driving by said driving means is set as a preset maximum aperture; and (e) means for blocking said driving in the initial displacement of said operating end portion by the amount of displacement of said operating end portion corresponding to an aperture error arising when said diaphragm blade means is stopped down from said preset maximum aperture by said driving means.

2. The device according to claim 1, wherein said driving means includes a first driving member having said operating end portion and a second driving member engaging said diaphragm blade means, and said blocking means is provided between said first driving member and said second driving member.

3. The device according to claim 2, wherein said control means includes cam means provided in said second driving member.

4. The device according to claim 3, wherein said blocking means includes engaging portions having a gap therebetween and provided on said first and second driving members so that said first driving member engages said second driving member after said first driving member has effected a predetermined displacement.

5. The device according to claim 4, wherein said photographic lens has a magnification changing lens system slidable in the direction of the optic axis thereof, and said setting means includes means for displacing said second driving member so as to vary the size of said gap in accordance with the sliding movement of said magnification changing lens system.

6. The device according to claim 5, wherein said second driving member includes a diaphragm driving ring formed with said cam means and movable with said diaphragm blade means in the direction of the optic axis in response to the sliding movement of said magnification changing lens system, and said setting means includes means for displacing said cam means relative to said diaphragm blade means in response of the movement of said diaphragm driving ring.

* * * * *